(12) United States Patent
Oh et al.

(10) Patent No.: US 8,720,925 B1
(45) Date of Patent: May 13, 2014

(54) INTELLIGENT SIDE STEP APPARATUS FOR VEHICLE

(71) Applicant: Hyundai Motor Company, Seoul (KR)

(72) Inventors: Young Sub Oh, Suwon-si (KR); Hyung Gyung Kim, Suwon-si (KR); Dong Eun Cha, Suwon-si (KR); Bock Cheol Lee, Suwon-si (KR); Seung Mok Lee, Osan-si (KR); Phil Jung Jeong, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/799,918

(22) Filed: Mar. 13, 2013

(30) Foreign Application Priority Data

Nov. 5, 2012 (KR) .................. 10-2012-0124049

(51) Int. Cl.
*B60R 3/00* (2006.01)
(52) U.S. Cl.
USPC .......................................... 280/166; 280/163
(58) Field of Classification Search
USPC ............ 280/163–169; 180/163, 164.1, 164.2, 180/162, 166; 105/444, 449
See application file for complete search history.

(56) References Cited

U.S. PATENT DOCUMENTS

| | | | | |
|---|---|---|---|---|
| 5,842,709 A * | 12/1998 | Maccabee | ...................... | 280/166 |
| 5,957,237 A * | 9/1999 | Tigner | .......................... | 182/127 |
| 7,377,531 B2 * | 5/2008 | Fabiano et al. | ............... | 280/163 |
| 7,513,520 B2 * | 4/2009 | Okuyama | ..................... | 280/166 |
| 7,857,337 B2 * | 12/2010 | Ferguson et al. | ............. | 280/166 |
| 8,297,635 B2 * | 10/2012 | Agoncillo et al. | ............ | 280/166 |

FOREIGN PATENT DOCUMENTS

KR 10-2005-0031491 A 4/2005

* cited by examiner

*Primary Examiner* — John Walters
*Assistant Examiner* — James Triggs
(74) *Attorney, Agent, or Firm* — Morgan, Lewis & Bockius LLP

(57) ABSTRACT

An intelligent side step apparatus for a vehicle may include a linear motor having a stator fixed to a vehicle body, with both ends thereof being positioned in a traverse direction of the vehicle, and a mover engaged to the stator and slidable along the stator when a current may be supplied to the stator, a side step that may be rotatably combined with the mover, and a step actuator that may be connected to the mover and engaged to an end of the side step to selectively rotate the side step.

5 Claims, 5 Drawing Sheets

INTELLIGENT SIDE STEP APPARATUS FOR VEHICLE

CROSS-REFERENCE TO RELATED APPLICATION

The present application claims priority to Korean Patent Application No. 10-2012-0124049 filed on Nov. 5, 2012, the entire contents of which is incorporated herein for all purposes by this reference.

BACKGROUND OF THE INVENTION

1. Field of the Invention

The present invention relates to an intelligent side step apparatus for a vehicle, and more particularly, an intelligent side step apparatus for a vehicle which operates in a rotary type and extends in the left-right direction (width direction) of a vehicle.

2. Description of Related Art

Some of recreation vehicles higher than sedans are equipped with a sidestep 1 for convenient of a passenger, as shown in FIG. 1.

However, a common sidestep 1 is simply fixed to a vehicle body 2 (side sill outer panel) and cannot expand in the left-right direction (width direction), so that a passenger is inconvenienced in using the sidestep 1 when getting in/out of a vehicle.

That is, a passenger can step on the sidestep 1 well in getting out of a vehicle and accordingly it is possible to prevent the passenger from getting hurt from a fall only when the sidestep 1 is conspicuous to the passenger, and the passenger can easily step and get in the vehicle only when the sidestep 1 protrudes much from the vehicle body 2.

However, since the sidestep 1 of the related art has a structure fixed to the vehicle body 2 not to expand in the left-right direction (width direction) of the vehicle body, a passenger is inconvenienced in using the sidestep 1 for getting in/out of a vehicle.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to contributing to improving convenience of a passenger getting in/out of a vehicle and improving the commercial value of the vehicle, by providing a side step apparatus for a vehicle which can operate in a rotary type and expand in the left-right direction (width direction) of the vehicle body.

In an aspect of the present invention, an intelligent side step apparatus for a vehicle, may include a linear motor having a stator fixed to a vehicle body, with both ends thereof being positioned in a traverse direction of the vehicle, and a mover engaged to the stator and slidable along the stator when a current is supplied to the stator, a side step that is rotatably combined with the mover, and a step actuator that is connected to the mover and engaged to an end of the side step to selectively rotate the side step.

The mover may include a slider slidably engaged to the stator, and a movable bar having an end to which the slider is fixed and the other end to which the side step is rotatably coupled.

The step actuator may include a step motor mounted onto the other end of the movable bar, a step gear that is formed at the end of the side step, a motor gear fixed to a motor shaft of the step motor, wherein the motor gear is engaged with the step gear.

The stator is fixed to a side sill outer panel where a vehicle door is positioned.

The step actuator may include a step motor mounted onto an end of the mover, a step gear that is formed at the end of the side step, a motor gear fixed to a motor shaft of the step motor, wherein the motor gear is engaged with the step gear.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
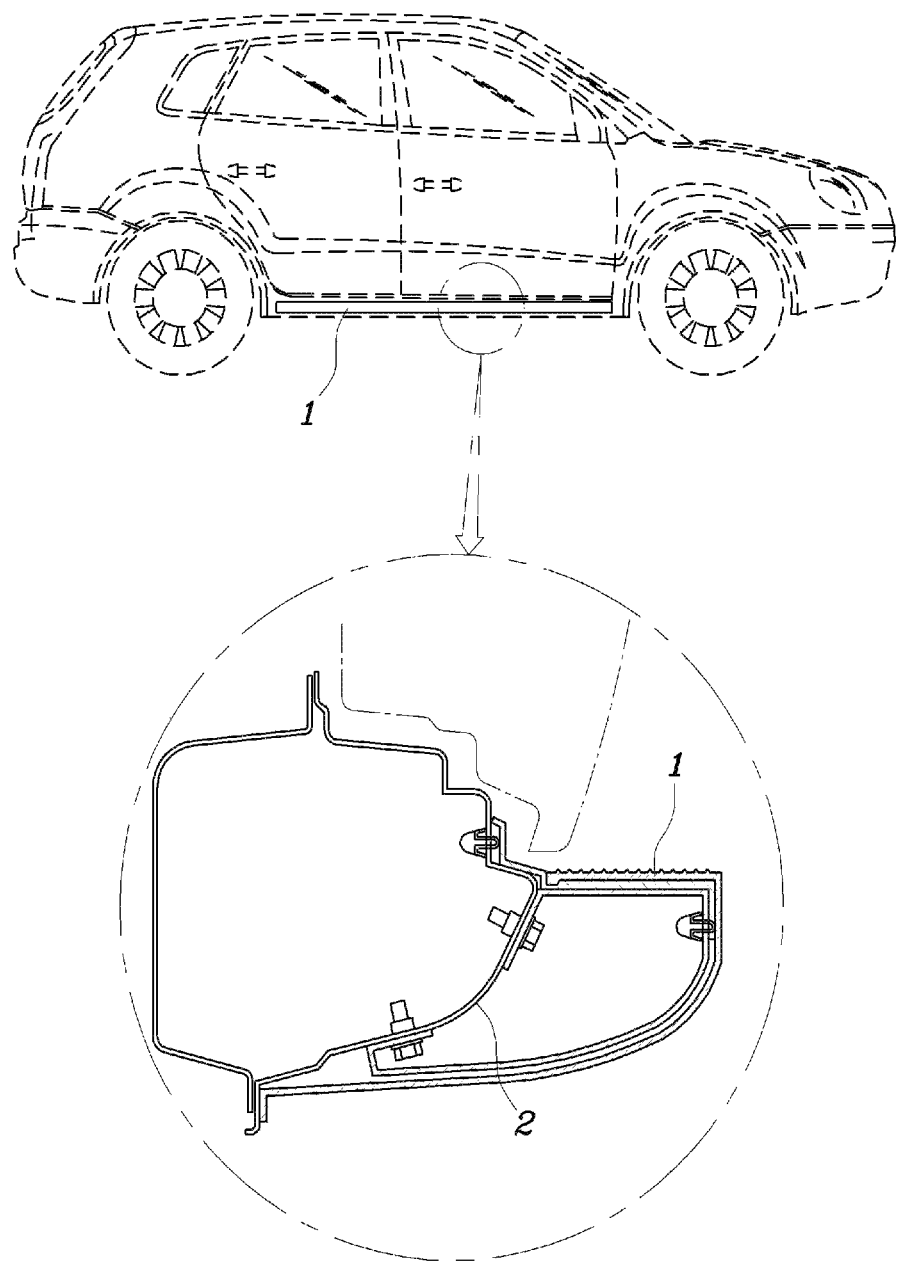
FIG. 1 is a view illustrating a side step of the related art.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

A side step apparatus for a vehicle according to embodiments of the present invention is described hereafter in detail with reference to the accompanying drawings.

Figure 2:
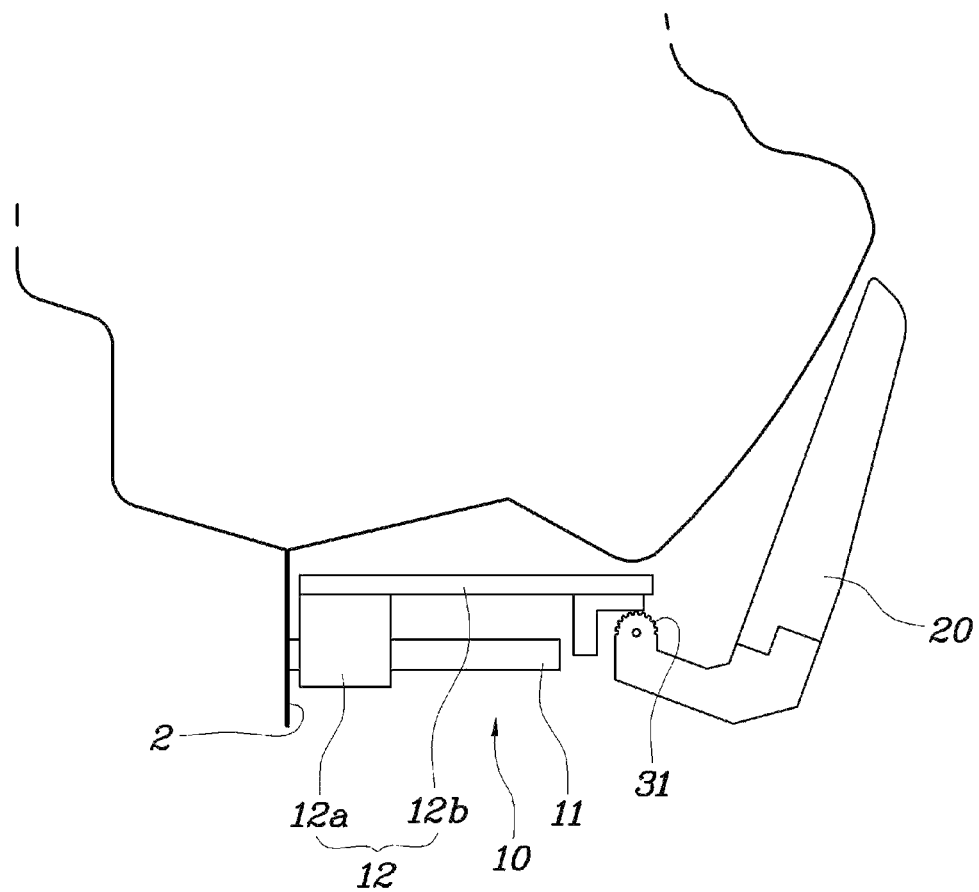
FIG. 2 is a view illustrating a side step apparatus for a vehicle according to an exemplary embodiment of the present invention.
Figure 3:
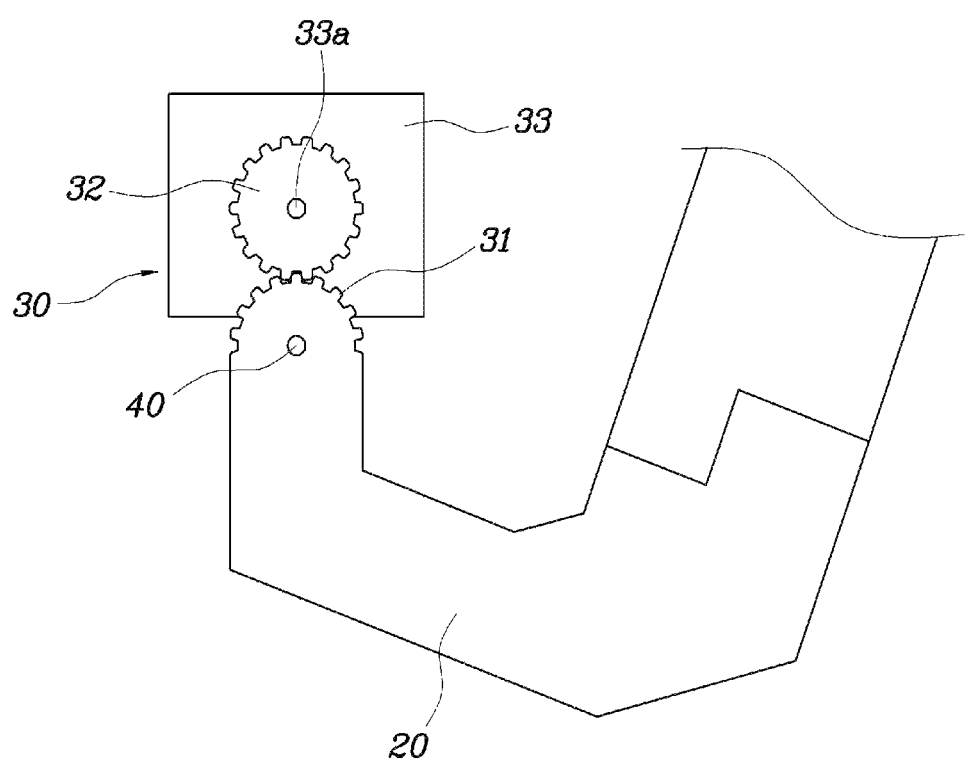
FIG. 3 is a view illustrating a step actuator of the present invention.
Figure 4:
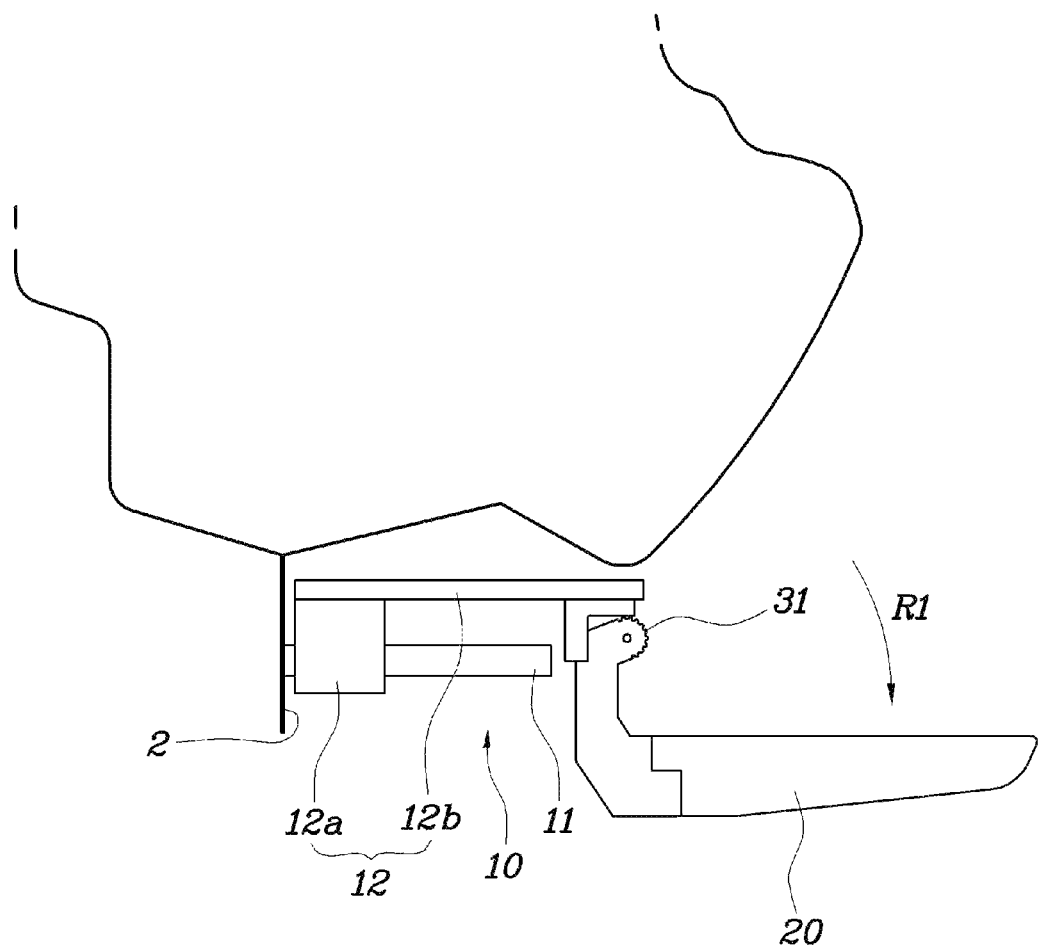
FIGS. 4 and 5 are views illustrating the operational status of a side step apparatus for a vehicle according to an exemplary embodiment of the present invention.

A side step apparatus for a vehicle according to an exemplary embodiment of the present invention, as shown in FIGS. 2 and 3, includes: a stator 11 of a linear motor 10 which is fixed to a vehicle body 2, with both ends positioned in the left-right direction of a vehicle, a mover 12 of the linear motor which is slidable along the stator 11, when a current is supplied to a coil of the stator 11, a side step 20 that is combined with the mover 12 to be rotatable with respect to the mover 12, and a step actuator 30 that is connected with the side step 20 for rotation of the side step 20.

It is preferable that the stator 11 of the linear motor 10 is fixed to a side sill outer pane where a vehicle door is positioned.

That is, the side step 20 is installed to provide convenience of a passenger getting in/out of a vehicle and it is preferable that the side step 20 is disposed at a door of the vehicle for a passenger to conveniently use the side step 20, and for this purpose, it is preferable that the vehicle body 2 where the stator 11 of the linear motor 10 is a side sill outer panel where the vehicle door is positioned.

Further, the mover 12 of the linear motor 10 is fitted on the stator 11 and includes a slider 12a that slides along the stator 11, when a current is supplied to the coil of the stator 11, and a movable bar 12b that is integrally combined at one end with the slider 12a and disposed in parallel with the stator 11.

The side step 20 is rotatably coupled to the end of the movable bar 12b by means of a rotary shaft 40.

Further, the step actuator 30 includes a step gear 31 that is disposed at one end of the side step 20, a motor gear 32 that is engaged with the step gear 31, and a step motor 33 that is combined with the motor gear 32 by a motor shaft 33a and provides torque to the motor gear 32.

The step gear 31, as shown in FIG. 3, may be integrally formed at the end of the side step 20, or may be independently formed from the side step 20 and combined with the side step 20 by a specific fastening member.

The step motor 33 is preferably fixed to the mover 12 of the linear motor 10, that is, the movable bar 12b, but is not limited thereto.

Further, it is preferable that the linear motor 10 and the step motor 33 are operated by a passenger operating a switch.

The operation of an exemplary embodiment of the present invention is provided hereinafter.

FIG. 2 shows that the side step 20 has rotated upward in close contact with the vehicle body 2 (side sill outer panel), in which the side step 20 is retracted and a passenger cannot use it.

As a passenger operates the switch to use the side step 20, the step motor 33 operates, the motor gear 32 rotates, and the step gear 31 engaged with the motor gear 32 rotates so that the side step 20 is rotated about the rotary shaft 40 (in the direction of an arrow R1) and deployed.

Figure 5:
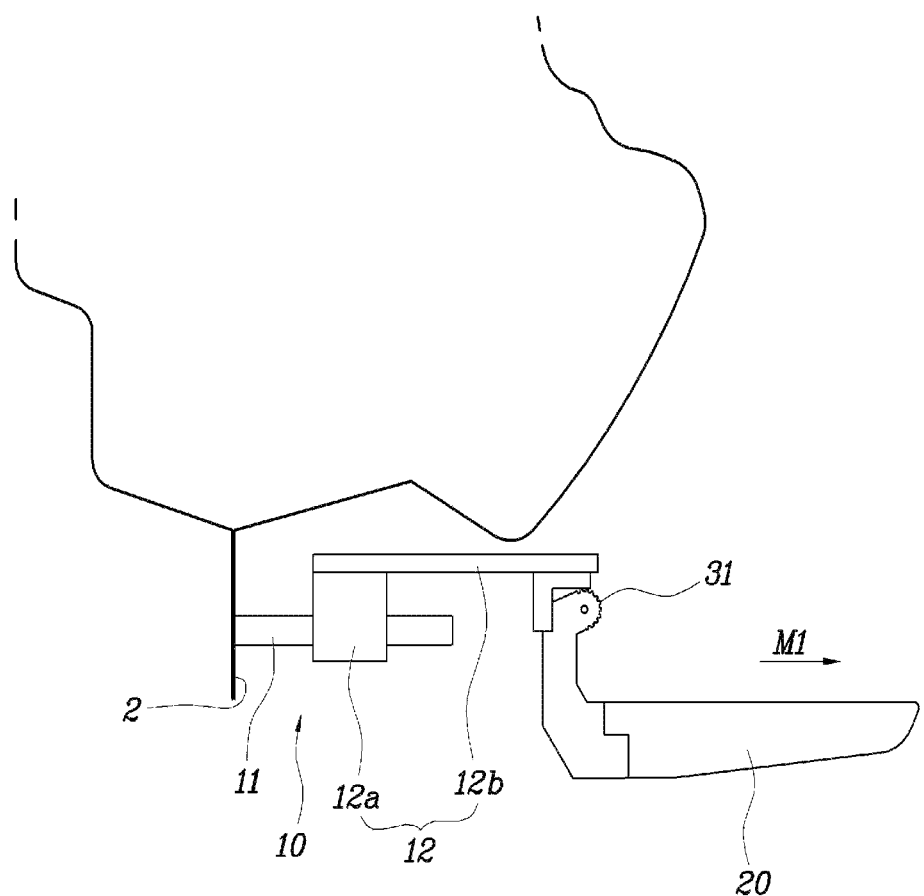

Further, when a current is supplied to the coil of the stator 11 of the linear motor 10, as the passenger operates the switch, the mover 21 of the linear motor 10 slides along the stator 11, resulting in moving and expanding the side step 20 combined with the mover 12 (in the direction of an arrow M1) to the side of the vehicle body 2, as shown in FIG. 5.

Accordingly, a passenger to get in/out of a vehicle can get in/out of the vehicle, seeing the side step 20 expanding to the side of the vehicle body 2, with a foot correctly on it so that it is possible to prevent the passenger from undesirably getting hurt from a fall and considerably improve safety and convenience of the passenger.

Meanwhile, although it was described that the side step 20 rotates first and then slides to expand in deploying, it may slide to expand first and then rotate, if necessary, or it may simultaneously rotate and slide to expand.

According to the side step apparatus for a vehicle of the present invention, as a passenger can get in/out of a vehicle, seeing the side step expanding to the side of a vehicle body, with a foot correctly on it, it is possible to considerably improve convenience of the passenger getting in/out of a vehicle and to prevent the passenger from getting hurt from a fall, so that it is possible to more safely protect the passenger.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An intelligent side step apparatus for a vehicle, comprising:
    a linear motor having:
        a stator fixed to a vehicle body, with both ends thereof being positioned in a traverse direction of the vehicle; and
        a mover engaged to the stator and slidable along the stator when a current is supplied to the stator;
    a side step that is rotatably combined with the mover; and
    a step actuator that is connected to the mover and engaged to an end of the side step to selectively rotate the side step.

2. The intelligent side step apparatus of claim 1, wherein the mover includes:
    a slider slidably engaged to the stator; and
    a movable bar having an end to which the slider is fixed and the other end to which the side step is rotatably coupled.

3. The intelligent side step apparatus of claim 2, wherein the step actuator includes:
    a step motor mounted onto the other end of the movable bar;
    a step gear that is formed at the end of the side step;
    a motor gear fixed to a motor shaft of the step motor, wherein the motor gear is engaged with the step gear.

4. The intelligent side step apparatus of claim 1, wherein the stator is fixed to a side sill outer panel where a vehicle door is positioned.

5. The intelligent side step apparatus of claim 1, wherein the step actuator includes:
    a step motor mounted onto an end of the mover;
    a step gear that is formed at the end of the side step;
    a motor gear fixed to a motor shaft of the step motor, wherein the motor gear is engaged with the step gear.

* * * * *